Jan. 7, 1930.  W. C. SANDERS ET AL  1,742,825
RAILWAY PASSENGER CAR AXLE
Filed April 18, 1928

INVENTORS:
Walter C. Sanders
Joel Hektner,
by Cam Cam & Gravely
THEIR ATTORNEYS.

Patented Jan. 7, 1930

1,742,825

UNITED STATES PATENT OFFICE

WALTER C. SANDERS AND JOEL HEKTNER, OF CANTON, OHIO, ASSIGNORS TO THE TIMKEN ROLLER BEARING COMPANY, OF CANTON, OHIO, A CORPORATION OF OHIO

RAILWAY-PASSENGER-CAR AXLE

Application filed April 18, 1928. Serial No. 270,846.

Our invention relates to railway car axle construction, particularly to the construction of railway passenger car axles. It has for its principal object a construction which is interchangeable with present standard railway car axles and which is provided with antifriction bearings. Another object is to permit creeping of the axle so as to distribute the wear on the inner bearing members. Another object is to accurately position and firmly hold the antifriction bearings in place.

Figure 1:
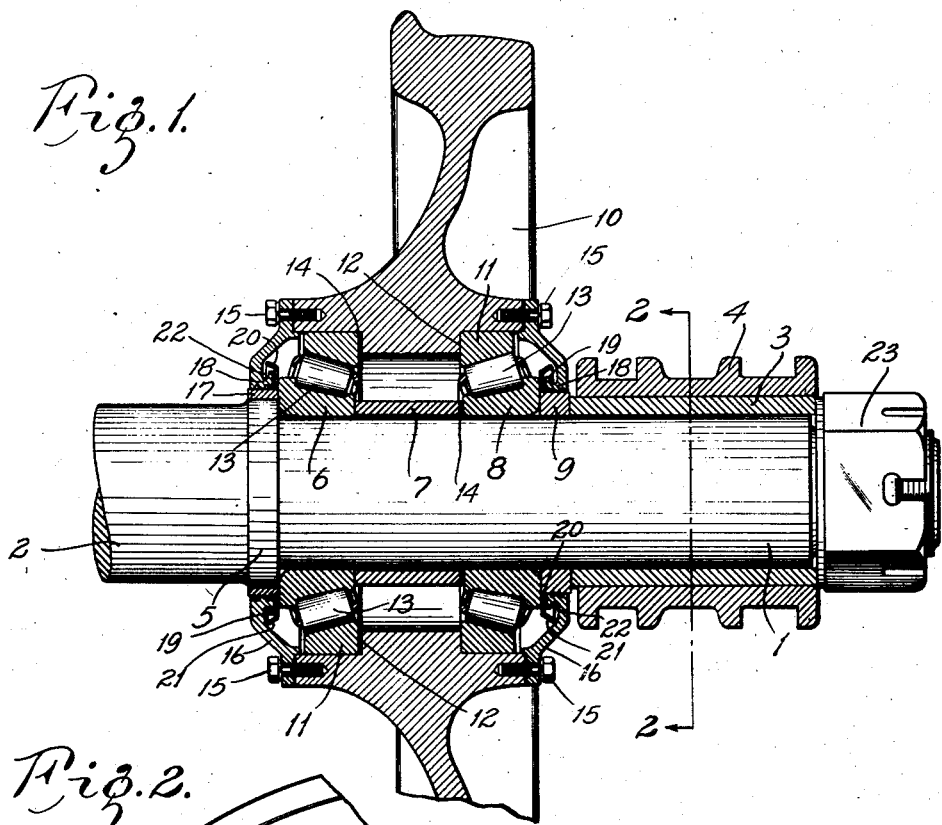
Figure 2:
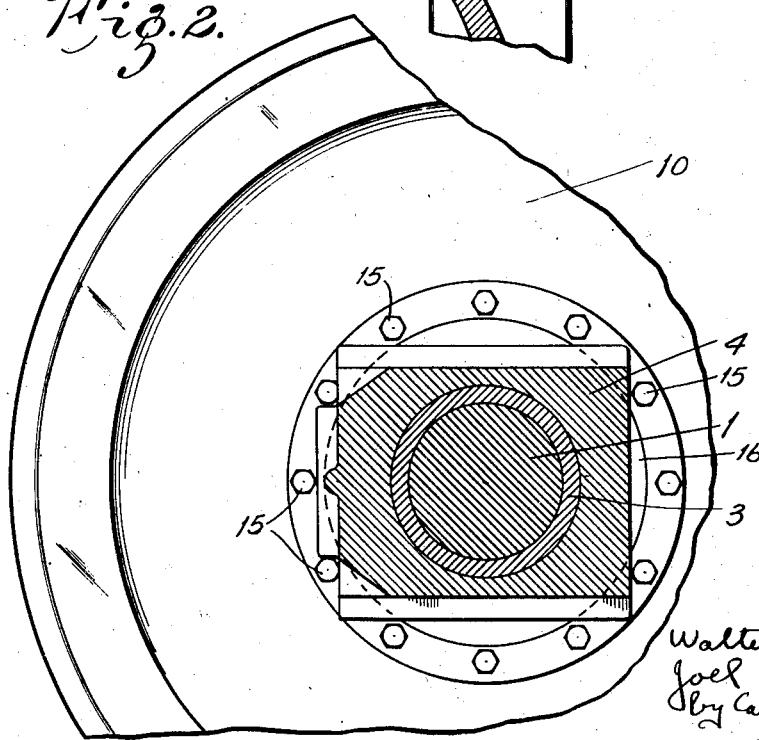

In the accompanying drawing, wherein like numerals refer to like parts wherever they occur, Fig. 1 is an elevation of the end portion of a railway axle and a vertical longitudinal section of parts associated therewith and embodying our invention; and Fig. 2 is a vertical cross-section on the line 2—2 of Fig. 1.

Each end portion 1 of an axle 2 extends through a bearing sleeve 3 that is mounted in a journal box 4 adapted to fit in a pedestal of standard construction (not shown in the drawing). This is the present standard passenger car axle construction.

On the axle some distance inwardly from the journal box 4 is a shoulder 5 against which abuts the large end of the cone 6 or inner bearing member of a conical roller bearing. Abutting against the small end of said cone 6 is a sleeve 7 whose inner diameter is larger than the diameter of the axle 2 at that point. The small end of a second bearing cone 8 abuts against said sleeve 7; and abutting against said second or outermost bearing cone 8 is a ring 9 that is tight on the axle as by being shrunk thereon. Thus the bearings are held between the shoulder 5 and the ring 9.

Mounted in the counterbored end portions of the hub of a hollow wheel 10 are bearing cups 11, said cups abutting against shoulders 12 in the wheel hub. Conical rollers 13 are interposed between the respective cups and cones. Bearing adjustment shims 14 are illustrated between the sleeve and the outermost bearing cone 8 and between the shoulder and the innermost bearing cup 11. One or both sets of shims may be dispensed with.

Secured to the wheel as by cap screws 15 are closure rings 16 that enclose the hub of the wheel. One of said rings surrounds a collar 17 on said shoulder 5 and the other surrounds said bearing abutment ring 9. Said closure rings 16 have inwardly projecting tubular portions 18 provided with an outwardly extending annular rib 19. Washers 20 secured to said collar and said ring respectively have flaring portions 21 overhanging the channels 22 formed between said ribs 19 and the end walls of the closure rings 16.

Said bearing sleeve 3 in said journal box abuts against the bearing abutment ring 9 and is held in position by means of a nut 23 on the end of the axle 2. Said sleeve 3 and said ring 9 together prevent any movement of the bearings. The axle ordinarily does not rotate; but it and said sleeve may creep in said journal box. This will serve to distribute the wear on the bearing cone.

The above described axle construction is adapted for replacing the axles of railway passenger cars now in use, being easily interchangeable with present standard railway car axles and making use of the present standard pedestals. The wheels are permitted differential movement and the antifriction bearings are much superior to the ordinary plain bearing.

What we claim is:

1. A railway car axle construction comprising a journal box, a bearing sleeve therein, an axle extending into said sleeve and projecting slightly beyond it, a wheel having an enlarged bore mounted on said axle inwardly of said journal box, an antifriction bearing interposed between said wheel and said axle, a bearing abutment shoulder on said axle at the inner end of said bearing, a bearing abutment ring tight on said axle between said sleeve and an inner bearing member and a nut on the projecting end of said axle engaging said sleeve.

2. A railway car axle construction comprising an axle having a shoulder thereon, a wheel having an enlarged bore and disposed outwardly from said shoulder, a bearing cone on said axle abutting against said shoulder, a second bearing cone on said axle spaced from said first bearing cone, a spacing sleeve interposed between said bearing cones, bearing cups in the counterbored ends of the hub of said wheel, conical bearing rollers between the respective cups and cones, a bearing abutment ring fixed on said axle and engaging said second or outermost bearing cone, a journal box into which the end portion of said axle extends, a sleeve interposed between said journal box and said axle, said sleeve engaging said bearing abutment ring and a nut on the end of said axle engaging said sleeve.

Signed at Canton, Ohio, this 3rd day of April, 1928.

WALTER C. SANDERS.
JOEL HEKTNER.